Jan. 5, 1926.  1,568,534
W. H. RUTTLE
ICE CREAM CUTTER
Filed Nov. 14, 1922  2 Sheets-Sheet 1
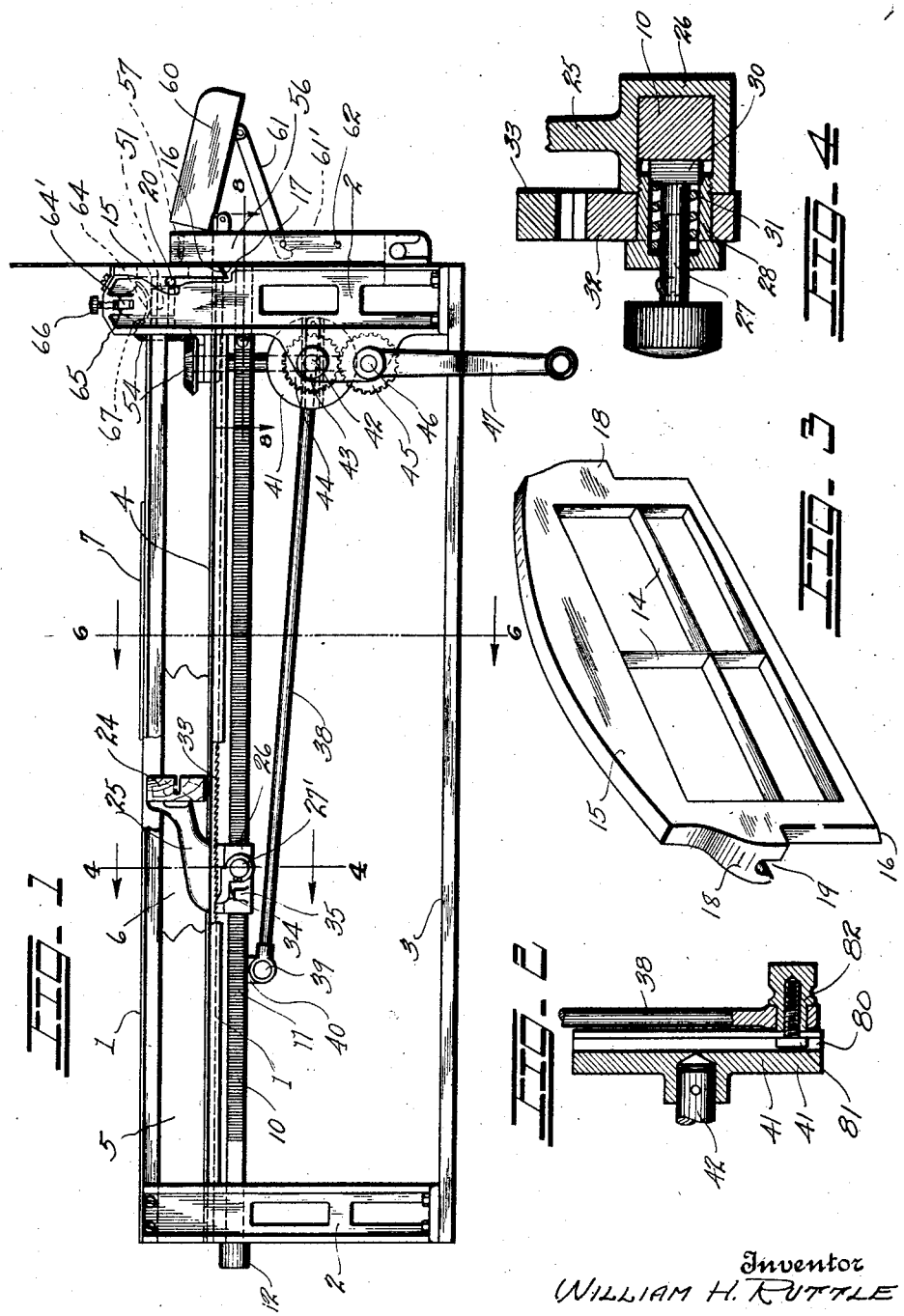
Inventor
WILLIAM H. RUTTLE
By Attorney
Richard J. Cook Jan. 5, 1926.
W. H. RUTTLE
ICE CREAM CUTTER
Filed Nov. 14, 1922
1,568,534
2 Sheets-Sheet 2
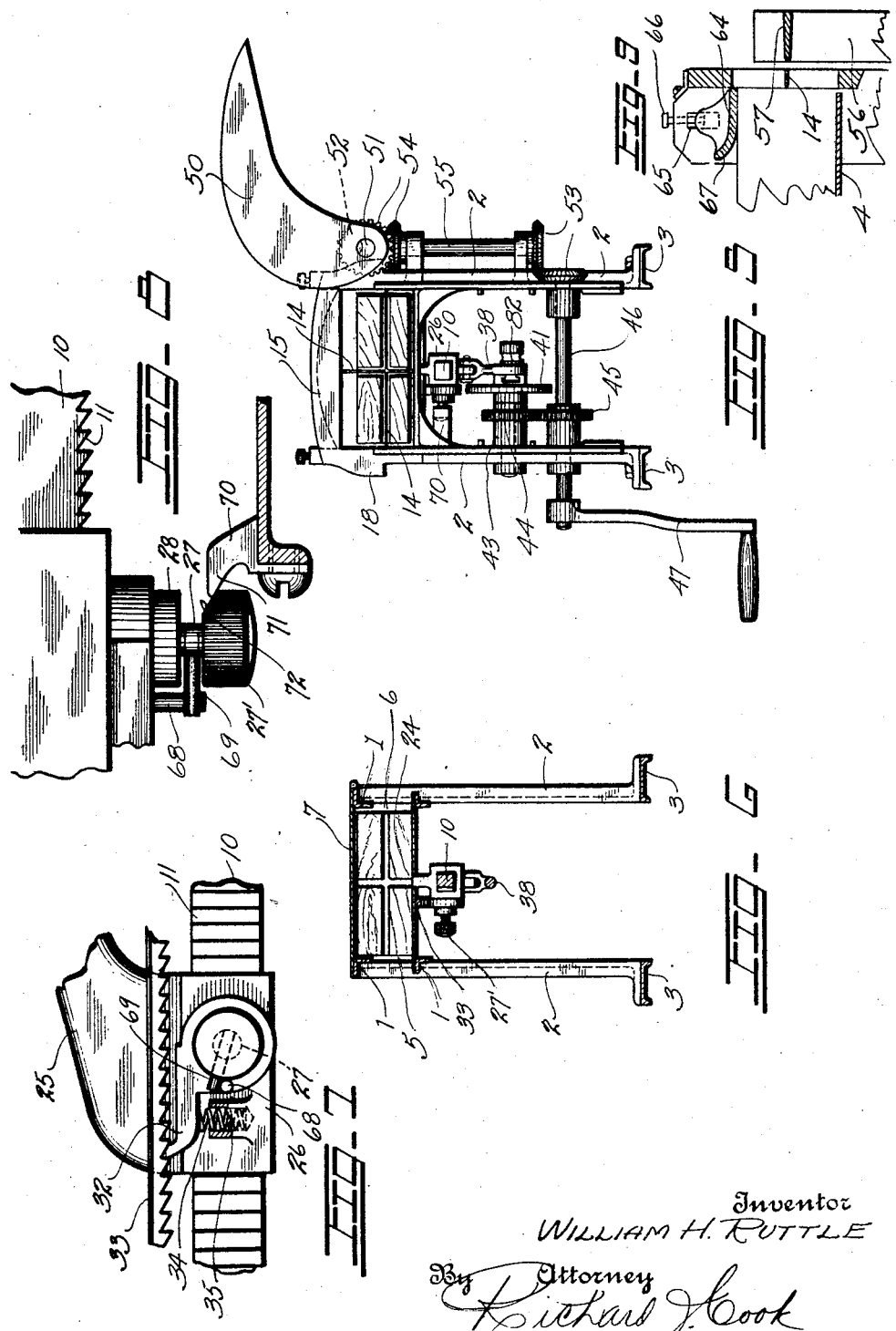
Inventor
WILLIAM H. RUTTLE
By Attorney
Richard J. Cook Patented Jan. 5, 1926.

1,568,534

UNITED STATES PATENT OFFICE.

WILLIAM H. RUTTLE, OF SEATTLE, WASHINGTON.

ICE-CREAM CUTTER.

Application filed November 14, 1922. Serial No. 600,940.

*To all whom it may concern:*

Be it known that I, WILLIAM H. RUTTLE, a citizen of the United States, and a resident of Seattle, King County, State of Washington, have invented certain new and useful Improvements in Ice-Cream Cutters, of which the following is a specification.

This invention relates to improvements in slicing and cutting machines and more particularly to machines for measuring and cutting ice cream, butter, and the like, into bars of a predetermined size.

It is the principal object of this invention to provide a machine wherein a large brick of ice cream, butter, or like material, may be divided into small bars of predetermined size. More specifically, the invention resides in the provision of a machine wherein a large brick of ice cream may be placed and which comprises means whereby the brick may be automatically advanced against a series of fixed cutters and into the path of a revolving knife whereby small bars of a pre-determined size are severed from the strips formed by the fixed cutters.

Another object of the invention is to provide interchangeable cutters for the machine so that bars of different size may be formed.

A still further object is to provide means whereby the brick of ice cream may be intermittently advanced different distances to provide for the slicing off of bars of various thickness.

Other objects reside in the various details of construction and combination of parts embodied in the invention.

In accomplishing these and other objects, I have provided the improved details of construction, the preferred forms of which are illustrated in the accompanying drawings, wherein—

Figure 1 is a side view of a machine constructed in accordance with the present invention.

Figure 2 is a detail sectional view of the advancing wheel, showing the adjustable connection of the advancing rod.

Figure 3 is a perspective view of one of the interchangeable cutters.

Figure 4 is a sectional detail, taken on line 4—4 in Figure 1, illustrating the ratchet locking devices.

Figure 5 is a front end view of the cutter.

Figure 6 is a transverse, sectional view on line 6—6 in Figure 1.

Figure 7 is an enlarged side view of the locking pawl and ratchets.

Figure 8 is a detail illustrating means for releasing the advancing block from the ratchet bar.

Figure 9 is a detail, sectional view illustrating the transverse press bar adjacent the cutter blades and the separating and spreading plate.

Referring more in detail to the drawings—

The ice cream block from which bars are cut by the present machine is most easily handled when frozen in a block which would be about two feet long, three inches thick and six inches wide. This is placed in the machine within a rectangular guide frame consisting of four angle bars 1 supported by connection with end frames 2 at opposite ends of the machine. To insure rigidity of construction, legs of the opposite end frames are bolted at their lower ends to longitudinally extending connecting beams 3. A horizontal, centrally slotted floor plate 4 is mounted between the two lower angle bars to support the ice cream block and integral with this are side wall plates 5 and 6. A cover 7 is hingedly mounted to extend along the central part of the frame to prevent upward buckling of the ice cream block when pressure, to press it against the cutters, is applied against the end thereof.

Extending longitudinally of the machine and centrally below the frame, is a ratchet bar 10. This bar is square in cross section and is provided on one side with ratchet teeth 11. It also is slidably supported in bearings 12 formed in the end frames 2, and serves as a means through which the ice cream brick is advanced intermittently against the cutters.

The cutters consist of blades 14 fixed in a rectangular frame 15 that is removably fastened in the forward end of frame 2 in such manner that the ice cream block, when advanced in the guide, will be pressed against the blades and will be divided vertically and horizontally thereby. The cutters are provided in interchangeable frames which may contain one or more of the vertical and horizontal blades, according to the size of bars or strips into which the brick is to be divided. A preferred type of cutter frame is illustrated in Figure 3. This has a beveled lower edge 16 that is adapted to engage within a correspondingly shaped slat 17 in the forward end frame of the machine and has bosses 18 at its ends provided with downwardly opening notches 19 adapted to seat down over studs 20 formed on the sides of the frame to hold it in place.

The ice cream block, when placed in the guide ways, is advanced intermittently against the cutter blades 14 by reciprocal movement of the bar 10 and a block 24 which engages with the rearward end of the ice cream brick; the block 24 being mounted in a bracket 25 having a bearing portion 26 at its lower end that is slidable on the bar 10 and which has a connection therewith which will cause the block to be advanced only with each forward reciprocal movement of the bar. The connecting means consists of a pin 27 slidable in a cap 28 threaded into a box formed on the side of the bracket. The pin has a ratchet head 30 on its inner end engaging the toothed surface of the bar 10 and a spring 31 located within the cap about the pin bears against the head to hold it yieldingly seated.

Means for preventing rearward movement of the block when the bar 10 is moved rearwardly, consists of a ratchet tooth 32 that is pivoted about the cap, see Figures 4 and 7, and at its outer end engages with a ratchet toothed bar 33 fixed to the frame parallel with bar 10. This tooth is held yieldingly engaged with the teeth of bar 33 by means of a spring 34 that is seated in a socketed boss 35 on the side of bearing portion 26 of the bracket 25.

Reciprocal movement of the bar 10 which will intermittently advance the brick against the cutters 14 is effected by means of a connecting rod 38 which at one end is pivotally connected by means of a pin 39 with a boss 40 on the bar 10, and at its opposite end is eccentrically connected to a wheel 41 that is fixed to the inner end of a stub shaft 42 that is revolubly supported in a bearing 43 formed on the forward end supporting frame. This stub shaft has a gear wheel 44 fixed thereto which meshes with a gear wheel 45 on a driving shaft 46 extending between the supporting legs of the forward frame and which has a crank 47 at one end whereby it may be turned.

When using the type of cutter illustrated in Figure 3, the brick will be divided longitudinally into four strips as it is advanced against the blades, and these are divided into blocks by means of a blade 50 mounted on a short shaft 51 supported in a bearing 52 on the forward end frame 2; the knife being revolubly driven from the shaft 46 through two pairs of bevel gears 53 and 54 and a vertical shaft 55 between gears of each pair. The knife is so mounted that it slices off the brick flush with the forward face of the end frame 2, and its movement is so synchronized with the movement of the bar 10 that it passes through the brick during backward movement of the bar.

The preferred shape of the blade is illustrated in Figure 5 which shows the cutting edge is formed on a gradually lessening curve from the base toward the outer end of the blade.

Supported with a frame structure 56 at the forward end of the machine is a separator and spreading plate 57, see Figures 1 and 9, which is alined horizontally with the horizontal cutter 14 and is for the purpose of preventing the several upper and lower parts of the ice cream bar from being mashed together again by the passing therethrough of the knife 50. It has a sharpened forward edge 58 and from this gradually increases in thickness as shown.

As the blocks are sliced from the strip they fall, or are advanced, onto a chute 60 that is supported at the forward end of the machine, and may be held at differently inclined positions by means of a supporting bar 61 having an end notch 61' engageable with studs 62.

To prevent upward breaking of the brick at a point adjacent the blades, due to its being pressed against the cutting blades, I have provided a transverse press bar 64 at this point which is held in place by guide bosses 64' at its ends that are slidable in guide slots 65 in the upper end portions of the forward frame 2 and are held in position by set screws 66. This bar has an upwardly turned guide lip 67 at its forward edge which presses the brick downwardly as it passes beneath the press bar.

To re-adjust the advancing block 24 after a brick has been advanced through the machine, it is necessary to pull outwardly on the pin 27 so as to release the head 30 from the teeth of bar 10. It is also necessary to release the ratchet tooth 32 from the teeth of bar 33. In order that these two operations may be easily done, I have fixed a stud 68 in the tooth 32 and a stud 69 in the pin 27 which, upon rotation of the pin will engage with stud 68 to effect the unseating of the tooth 32. For convenience the pin is equipped with a knurled head 27' whereby it can be easily manipulated.

To automatically release the pin 27 from the advancing bar 10 when the block 24 reaches the blades, I have fixed a releasing finger 70, see Figure 8, to the forward frame 2. This has a beveled surface 71 adapted to engage with a beveled inner surface 72 on the head 27' of pin 27, so that it acts to draw the pin outwardly and unseat it from the bar 10.

In order that bars of different thickness may be cut from a brick advanced through the machine, I have provided an adjustable connection between the end of connecting rod 38 and wheel 41. The wheel is provided with a radially extending, dovetail groove 80 in which the head of a bolt 81 is slidable toward or from the center of the wheel. A cap 82 is threaded onto the bolt to clamp the head at different positions of adjustment, and the end of rod 38 is pivotally fixed about the cap as shown in Figure 2. This connection provides that, by adjusting the bolt toward or from the center of the wheel, the rod 10 will be reciprocated through a smaller or greater distance and the brick advanced accordingly.

This machine can be used successfully for the cutting of ice cream bars, butter, or like material, and by the provision of cutters of different kinds can be made to cut bars of various sizes.

Having thus described my invention, what I claim as new therein and desire to secure by Letters Patent, is:

1. An ice cream cutter of the class described, comprising a frame including a guideway wherein ice cream bars may be advanced, a cutter frame removably fixed at one end of the guideway having blades therein against which the brick may be pressed to be divided lengthwise into strips, a blade rotatably supported and adapted to cut the strips transversely to form bars of equal size, a spreader plate mounted to spread the bars apart as they are advanced against it, a reciprocally mounted ratchet bar, a presser head for advancing the brick having ratchet connections with the bar bar whereby the brick will be advanced with each forward movement of the ratchet bar, means for reciprocating the bar and means synchronized therewith for revolving the transverse cutting blade.

2. In a machine of the class described, comprising a frame having a guideway therein for an ice cream brick, blades fixed at one end of the guideway against which the brick may be pressed to divide it into longitudinal strips and a revolving blade for cutting the strips transversely to form bars, of advancing means comprising a reciprocally movable ratchet bars, a presser head for the brick having a bracket slidable on the bar, a ratchet pin mounted in the bracket to engage the teeth of the bar to effect advancement of the brick with each advancing movement of the bar, a crank shaft, a wheel on the shaft, a connecting rod fixed at one end to the ratchet bar and at its other end eccentrically to the wheel, and means connected with the crank shaft for actuating the revolubly mounted blade so that it will sever the brick between its advancing movements.

Signed at Seattle, Washington, this 20th day of September, 1922.

WILLIAM H. RUTTLE.